United States Patent
Janardhanan et al.

(10) Patent No.: US 8,054,103 B1
(45) Date of Patent: Nov. 8, 2011

(54) SYNCHRONOUS CLOCK MULTIPLEXING AND OUTPUT-ENABLE

(75) Inventors: Jayawardan Janardhanan, Bangalore (IN); Gopalkrishna Ullal Nayak, Bangalore (IN); Vikas Kumar Sinha, Bangalore (IN); Sujoy Chakravarty, Bangalore (IN); Shivaprakash Halagur, Bangalore (IN); Somasunder Kattepura Sreenath, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/909,837

(22) Filed: Oct. 22, 2010

(51) Int. Cl.
*H03K 19/00* (2006.01)

(52) U.S. Cl. ......................................................... 326/93

(58) Field of Classification Search .............. 326/38–41, 326/46, 47, 54, 93
See application file for complete search history.

(56) References Cited

U.S. PATENT DOCUMENTS

| | | | | |
|---|---|---|---|---|
| 5,357,613 A * | 10/1994 | Cantrell et al. | ................ | 710/61 |
| 7,003,683 B2 * | 2/2006 | Muroor | ........................ | 713/500 |
| 7,167,024 B2 * | 1/2007 | Momtaz et al. | ................. | 326/46 |
| 7,205,792 B2 * | 4/2007 | Momtaz et al. | ................. | 326/46 |
| 7,348,797 B2 * | 3/2008 | Weinraub | ........................ | 326/40 |
| 7,504,857 B2 * | 3/2009 | Weinraub | ........................ | 326/40 |
| 7,583,106 B2 * | 9/2009 | Cumming et al. | ............... | 326/93 |
| 7,791,375 B1 * | 9/2010 | Clarke | ............................ | 326/93 |
| 7,795,920 B2 * | 9/2010 | Yasuda | ........................... | 326/93 |

* cited by examiner

*Primary Examiner* — Shawki S Ismail
*Assistant Examiner* — Thienvu Tran
(74) *Attorney, Agent, or Firm* — Ronald O. Neerings; Wade James Brady, III; Frederick J. Telecky, Jr.

(57) ABSTRACT

A synchronous circuit for clock multiplexing and output-enable is implemented using a pair of logic gates and an output block. Select signals and enable signals with the corresponding logic sense are provided as inputs to the pair of logic gates, which generate respective logic outputs. The output block contains synchronizers clocked by respective input signals, and receives the logic outputs also as inputs. The output block provides a selected one of the input signals as an output, the provision of the selected input signal being accomplished in a synchronous fashion. Enabling and disabling of the output are also performed synchronously.

16 Claims, 5 Drawing Sheets

SYNCHRONOUS CLOCK MULTIPLEXING AND OUTPUT-ENABLE

BACKGROUND

1. Technical Field

Embodiments of the present disclosure relate generally to digital circuits, and more specifically to a synchronous circuit for clock multiplexing and output-enable.

2. Related Art

Clock multiplexing refers to selection of one of multiple clocks received as inputs, with the selection of the clock based on the value of a select signal. Output-enable refers to a control whereby the provision of a signal as the output of a circuit is enabled (thereby providing the signal as the output) or disabled.

Clock multiplexing as well as output enable (provided by a circuit) are often required to be performed synchronously, i.e., required to be timed with respect to a time reference. Such synchronous operation may be required to enable the output of the clock multiplexing and/or output-enable operation to be rendered glitch free, the term glitch, generally, referring to an undesired narrow pulse in the output.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A digital circuit contains a logic gate to receive an enable signal and a select signal, and to generate a first logic output, the first logic output being generated as a logical combination of the enable signal and the select signal. The digital circuit contains another logic gate to receive the enable signal and a logical complement of the select signal, and to generate a second logic output, the second logic output being generated as a logical combination of the enable signal and the logical complement of the select signal. The digital circuit further contains an output block to receive a first input signal, a second input signal, the first logic output and the second logic output. The output block provides the first input signal as an output if the first logic output is at a first logic level and the second logic output is at a second logic level, the second input signal as the output if the first logic output is at the second logic level and the second logic output is at the first logic level, and disables provision of the first input signal or the second input signal as the output if each of the first logic output and the second logic output is at the second logic level. The output block, in response to a change in the value of the first logic output from the first logic level to the second logic level at a first time instance, disables the first input signal from being provided as the output at a second time instance synchronous with an active edge of the first input signal, and in response to a change in the value of the second logic output from the second logic level to the first logic level at a third time instance, provides the second input signal as the output at a fourth time instance synchronous with an active edge of the second input signal.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Device

Figure 1:
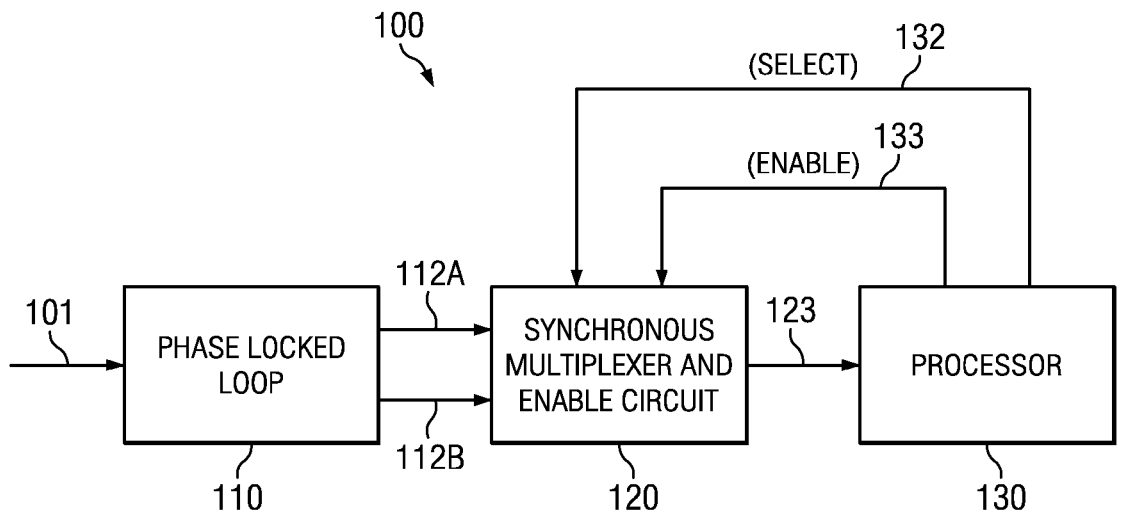
FIG. 1 is a block diagram illustrating the details of an example device in which several embodiments can be implemented.

FIG. 1 is a block diagram of an example device in which several embodiments can be implemented. Device 100 is shown containing phase locked loop (PLL) 110, synchronous multiplexer and enable circuit 120 and processor 130. Device 100 may additionally contain several components/sub-systems such as memory, input/output interfaces, etc., not shown in FIG. 1 for conciseness. Processor 130, which may be connected to sub-systems (such as memory, wireless transceivers, antenna, etc., not shown) receives a clock on path 123 (if enabled), and operates to provide desired features (e.g., mobile phone operations).

PLL 110 receives one or more source clocks on path 101, and generates clock signals of desired frequencies on path 112A and 112B. Synchronous multiplexer and enable circuit 120 receives the clocks on paths 112A and 112B, and select and enable signals on respective paths 132 and 133. Synchronous multiplexer and enable circuit 120 operates to provide one of the two clocks 112A and 112B on output 123 depending on the value of binary signal 132 (SELECT), and disables or enables the provision of the selected clock on output 123 depending on the value of binary signal 133 (ENABLE). Further, synchronous multiplexer and enable circuit 120 performs both the enable/disable operation, as well as changing/selection of the clock provided on output 123 in response to a change in signal 132 (SELECT) (and assuming signal 133 has a value specifying that output 123 be enabled), in a synchronous fashion.

Figure 2A:
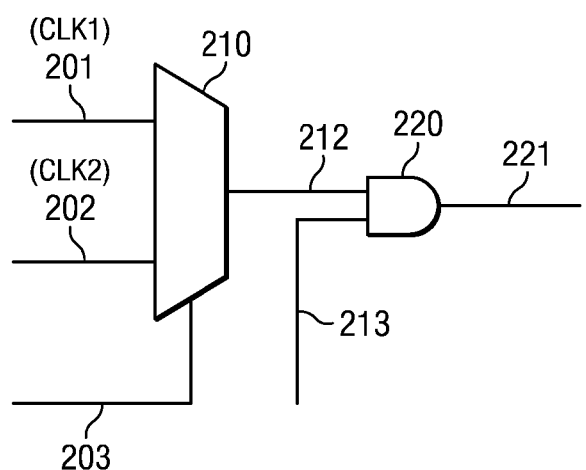
FIG. 2A is a diagram of a prior asynchronous multiplexer with asynchronous output-enable features.

FIG. 2A is a diagram of a prior circuit with asynchronous multiplexing and output-enable features, and is shown containing multiplexer (MUX) 210 and AND-gate 220. MUX 210 receives clocks Clk1 and Clk2 on paths 201 and 202 respectively, and forwards one of the clocks on path 212 depending on the value of select signal 203. AND gate 220 provides clock 212 on path 221 when enable signal 213 is at logic one, and disables the provision of clock 212 on path 221 (and instead provides a constant logic zero on path 212) when enable signal 213 is at logic zero. The circuit of FIG. 2A performs clock selection and output-enable in an asynchronous manner, as illustrated in the example timing diagram of FIG. 2B.

Figure 2B:
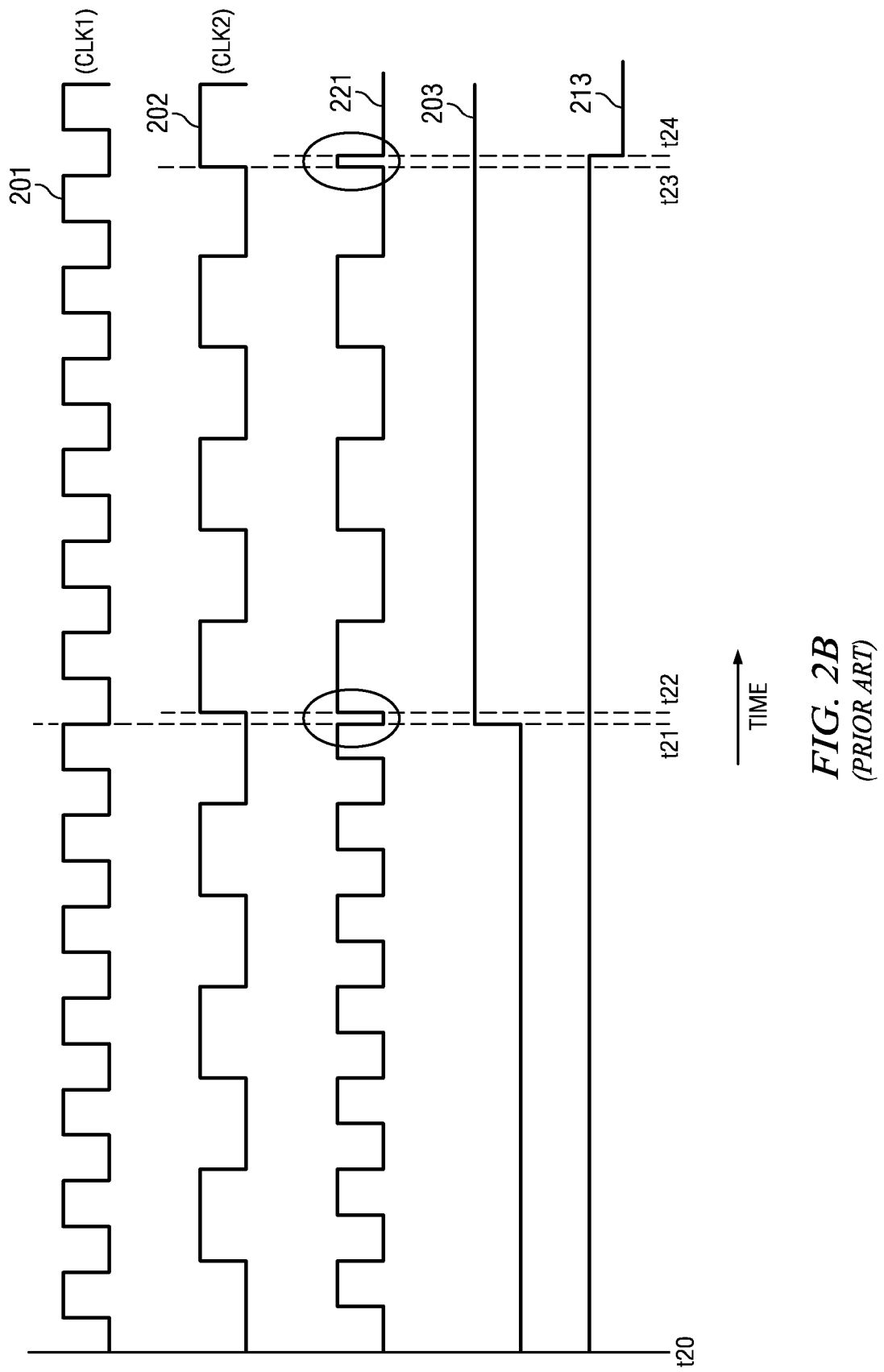
FIG. 2B is a timing diagram illustrating the operation of the circuit of FIG. 2A.

In FIG. 2B, select signal 203 is at logic zero from t20 to t21, and MUX 210 forwards clock 210 on path 212 in interval t20-t21. Enable signal 213 also being at logic 1 in interval t20-t21, AND gate 220 forwards clock 201 received on path 212 onto path 221. Select signal 203 transitions to logic one at t21, asynchronously with respect to the rising edge of clock 201, as well as the rising edge of clock 202. As a result, the clock on path 212 (and also on output 221) is changed asynchronously at t21. The negative pulse in waveform 221 from t21-t22 represents a 'glitch' (undesired logic excursions of a signal, such as, for example, narrow pulses) and may not be desirable, as such a glitch can cause digital circuits operating based on the clock provided on path 221 to malfunction.

Enable (output-enable) signal 213 transitions to logic zero at t24. Clock 202 provided on path 221 (from t23) is asynchronously set to logic zero at t24. The pulse in waveform 221 from t23-t24 also represents a 'glitch' and may not be desirable. The duration of such glitches may be shorter than the pulse widths of the inputs 201 and 202. In general, changing from one clock signal to another or enabling and disabling of clock signals may need to be performed synchronously, i.e., in response to a change in the select signal, a (synchronous) multiplexer may be required to continue to be provide the clock currently provided as output till end of a complete cycle of the clock (current cycle or future cycle), and start providing another clock from the start-of-cycle-edge of the clock (immediately next start-of-cycle or later start-of-cycle instants). Thus, corresponding edges of the clocks represent time references with respect to which multiplexing and/or output-enable are to be performed. Clock waveform 221 of FIG. 2B when provided to processor 130 may cause unpredictable operation of processor 130 and/or components connected to processor 130.

2. Synchronous Circuit

Figure 3:
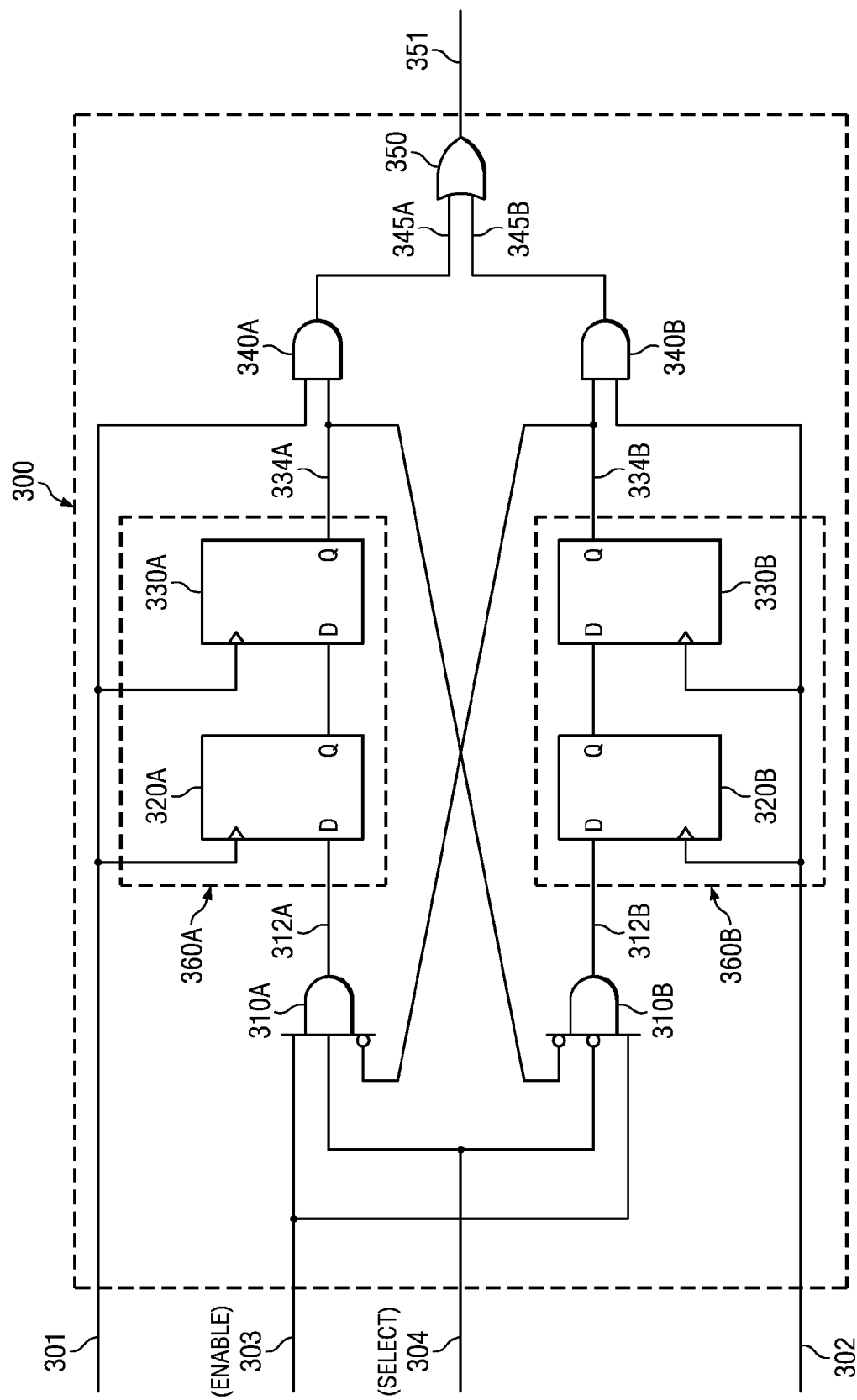
FIG. 3 is a diagram illustrating the details of a synchronous circuit for clock multiplexing and output-enable, in an embodiment.

FIG. 3 is a diagram illustrating the details of a synchronous circuit for clock multiplexing and output-enable, in an embodiment. Synchronous circuit 300, which can be implemented in place of synchronous multiplexer and enable circuit 120, is shown containing three-input AND gates 310A and 310B, two-input AND gates 340A and 340B, flip-flops 320A, 330A, 320B and 330B, and OR gate 350. Clocks are received on each of paths 301 and 302. Paths 301, 302, 303 and 304 of FIG. 3 correspond respectively to paths 112A, 112B, 133 and 132 of FIG. 1. The rising edges of clocks 301 and 302 are assumed to be the respective active edges. Flip-flops 320A, 330A, 320B and 330B are assumed to be positive edge-triggered D-type flip-flops. The combination of components/blocks 360A (second synchronizer), 360B (first synchronizer), 340A, 340B and 350 may be viewed as an "output block".

The value of enable signal 303 (ENABLE) determines whether a clock (one of clocks 301 and 302) is provided on output 351 or not. In the embodiment of FIG. 3, when 303 (ENABLE) is at logic one, one of clocks 301 (second input signal) and 302 (first input signal) is provided on output 351. When 303 (ENABLE) is at logic zero the provision of clocks on output 351 is disabled, and output 351 is at a continuous logic low. The value of select signal 304 (SELECT) determines which of the two clocks 301 and 302 is provided on output 351 (assuming 303 (ENABLE) is at logic one). When 304 (SELECT) is at logic one, clock 301 is provided on output 351. When 304 (SELECT) is at logic zero clock 302 is provided on output 351.

AND gate 310A (second logic gate) receives signals 303, 304 and the logical inverse (logical complement) of feedback signal 334B (first synchronized signal), and provides a logical AND of the three signals on path 312A (second logic output). AND gate 310B (first logic gate) receives signals 303, logical inverse of 304, and logical inverse of feedback signal 334A (second synchronized signal), and provides a logical AND of the three signals on path 312B (first logic output). Signal 312A is synchronized with the active edge of clock 301 by passing signal 312A through synchronizer 360A constituted by flip-flops 320A and 330A. Hence, even if signal 312A were to change value asynchronously (not aligned with the active edge of clock 301) in response to changes in one or both of signals 303 and 304, the operation of synchronizer 360A ensures that the change is propagated to node 334A only at an active edge of clock 301. Similarly, synchronizer 360B (constituted by flip-flops 320B and 330B) responds to any change in signal 312B only at an active edge of clock 302. Thus, signals 334A and 334B change synchronously with respective clocks 301 and 302, i.e., any change in signal 334A occurs only at an active edge of clock 301, despite any asynchronous change in signals 303 and/or 304. Similarly, any change in signal 334B occurs only at an active edge of clock 302, despite any asynchronous change in signals 303 and/or 304.

The logical inverse of signal 334A is fed back to AND gate 310B, and the logical inverse of signal 334B is fed back to AND gate 310A. The feedback of outputs 334A and 334B of respective synchronizers 360A and 360B to AND gates 310B and 310A respectively ensures that the clock currently provided on output 351 is de-activated from output 351 before the other clock is forwarded on output 351.

Figure 4:
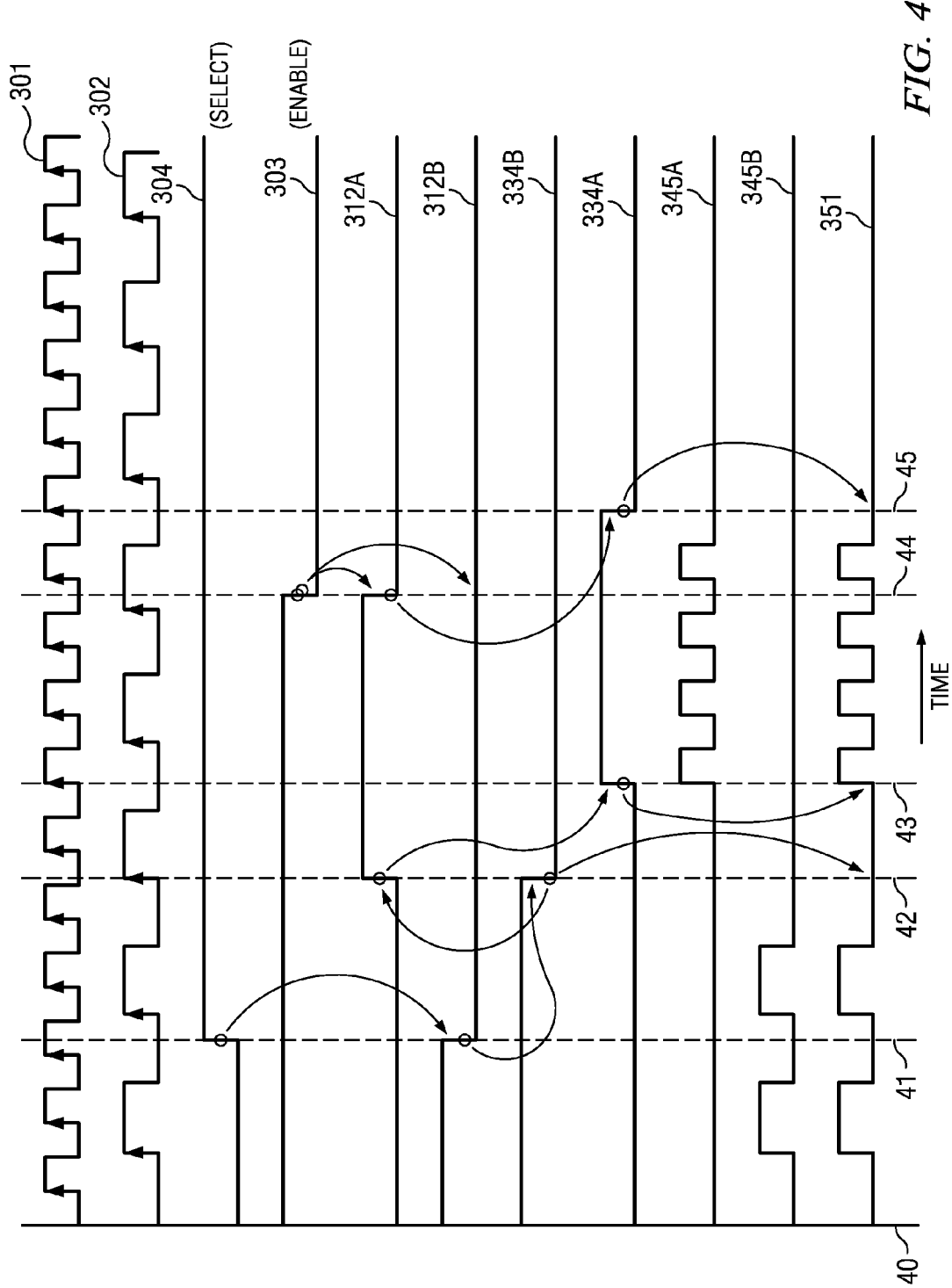
FIG. 4 is an example timing diagram illustrating the operation of a synchronous circuit for clock multiplexing and output-enable, in an embodiment.

AND gate 340A receives signal 334A and clock 301 and provides output 345A as a logical AND result of 334A and clock 301. AND gate 340B receives signal 334B and clock 302 and provides output 345B as a logical AND result of 334B and clock 302. OR gate provides on output 351 the logic OR result of signals 345A and 345B. The operation of synchronous circuit 300 is illustrated with the example waveforms of FIG. 4. It is assumed in the description of FIG. 4 that each of gates 310A, 310B, 340A, 340B and 350 are associated with zero gate delay.

In interval t40-t41, 304 (SELECT) is at logic zero, 303 (ENABLE) is at logic one, and synchronous circuit 300 provides clock 302 on output 351. At t41, 304 (SELECT) transitions to logic one. In response, signal 312B transitions to logic zero at t41 (first time instance). However, signal 334B does not transition to logic zero at t41, due to the operation of synchronizer 360B. Instead, signal 334B transitions to logic zero only at t42, two active clock edges (of clock 302) later. The transitioning to logic zero of signal 334B occurs at t42 (second time instance), synchronous with the second active edge of clock 302 after t41. Clock 302 continues to be provided on output 351 in the interval t41-t42. The transitioning to zero of signal 334B at t42, causes signal 345B to be set to logic zero, and clock 302 is prevented from being provided at output 351.

The transitioning to zero of signal 334B at t42, also causes signal 312A to be set to logic one. Although shown as occurring at t42, in typical implementation scenarios, signal 312A is set to logic one a brief delay after t42, and the time instance at which signal 312A is set to logic one may be referred to as a third time instance). However, signal 334A does not transition to logic one at t42, due to the operation of synchronizer 360A. Instead, signal 334A transitions to logic one only at t43, two active clock edges (of clock 301) later. The transitioning to logic zero of signal 334A occurs at t43, synchronous with the second active edge of clock 301 after t42. With signal 334A at logic one, signal 345A follows clock 301, and is provided at output 351, starting at t43 (fourth time instance). Thus, synchronous circuit 300 changes output 351 from providing clock 302 to clock 301 in a synchronous manner, i.e., in response to a change in 304 (SELECT), synchronous circuit 300 terminates provision of clock 302 only at the end of a complete cycle (at t42), then provides clock 301 starting from the start of a cycle of clock 301.

Signal 303(ENABLE) is shown as transitioning to logic zero at t44. As a result signal 312A transitions to logic zero (also at t44). However, synchronous circuit 300 does not immediately (i.e., at t44) disable provision of clocks at output 351, as may be observed from FIG. 4.

Signals 312B, 334B and 345B continue to be at logic zero. The transitioning to zero of signal 312A at t44 does not cause transition to logic zero at t42 of signal 334A due to the operation of synchronizer 360A. Instead, signal 334A transitions to logic zero only at t45, two active clock edges (of clock 301) later. As a result, signals 345A and output 351 are set to logic zero at t45. Again, it may be observed that synchronous circuit 300 disables output 351 synchronously, i.e., in response to a change in 303 (ENABLE) to logic zero (signaling that provision of clocks on output 351 be disabled), synchronous circuit 300 terminates provision of clock 301 at output 351 only at the end of a complete cycle (at t45). Waveform 351 may therefore be rendered substantially glitch-free despite asynchronous application of 304 (SELECT) or 303 (ENABLE).

However, synchronous circuit 300 of FIG. 3 may still be associated with other undesirable effects. Several enhancements to synchronous circuit 300 overcome such undesirable effects, as described next.

3. Enhancements

One undesirable effect that may be caused in synchronous circuit 300 is when 303(ENABLE) transitions immediately (or closely following) a change in the value of 304 (SELECT). To illustrate with reference to FIG. 3, assume 304 (SELECT) changes to logic one after having been at logic zero for several cycles of clock 301 or 302. As a result, signal 312B would transition to zero (immediately, assuming zero delay in gate 310B). Signal 312A would transition to logic one after the delays encountered by signal 312B in synchronizer 360B, i.e., after at least two rising edges of clock 302 from the time 304 (SELCT) transitions to logic one. If 303 (ENABLE) were to transition to logic zero just after signal 312A transitions to logic one, then signal 312A would be set to logic zero again. Thus, a positive pulse on path 312A may be generated after 303 (ENABLE) transitions to logic zero. The positive pulse may propagate to node 334A, and cause clock 301 to be provided on output 351 for the duration of the positive pulse of 312A, thereby again resulting in a glitch at output 351. Similar pulses may be generated on node 312B (and hence 345B as well) for the corresponding signal transitions, and may result in glitches in output 351.

Figure 5:
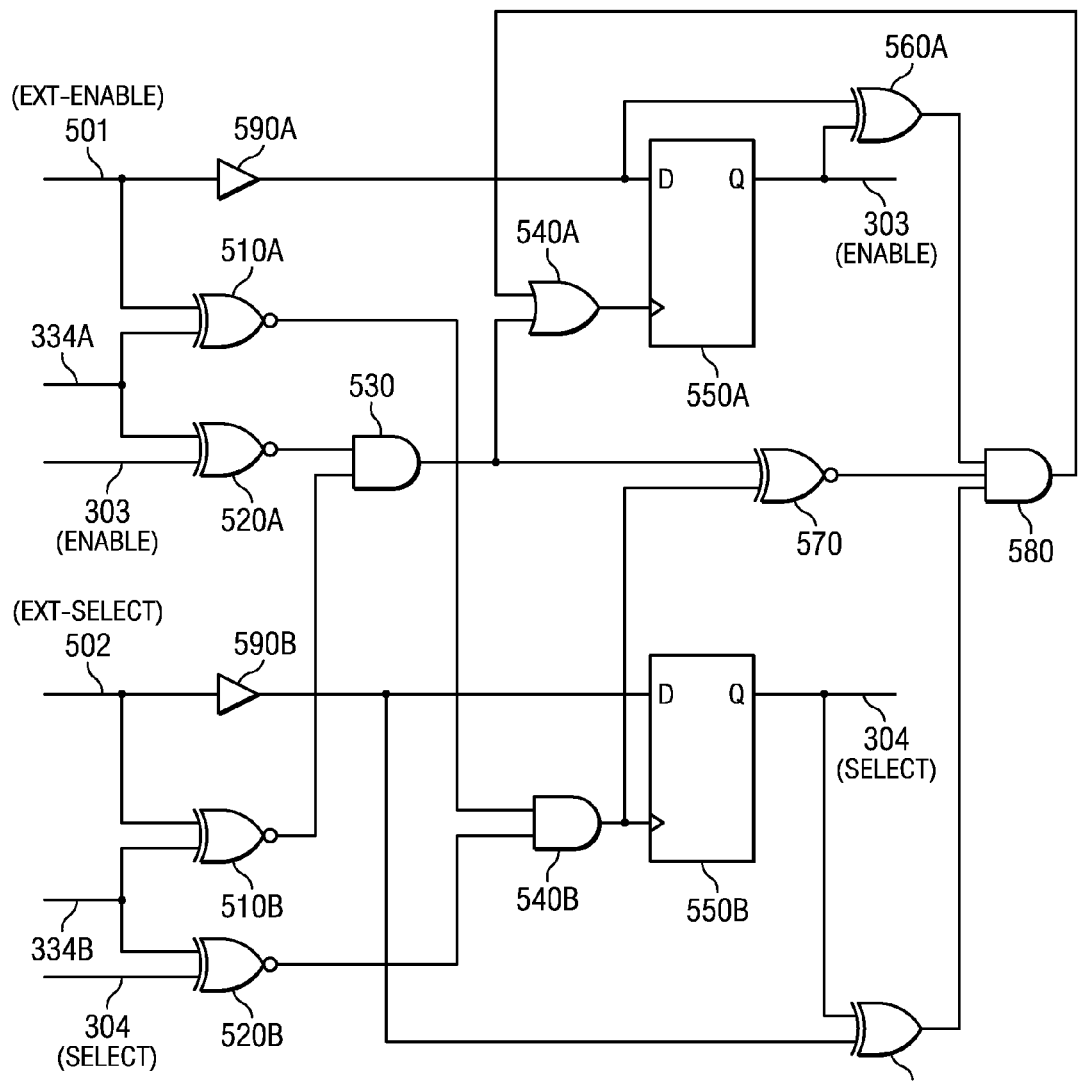
FIG. 5 is a diagram illustrating the details of circuit enhancements used in combination with a synchronous circuit for clock multiplexing and output-enable, in an embodiment.

In an embodiment, such glitches are prevented from occurring by ensuring that, subsequent to a change in a first one of signal-pair 303(ENABLE) and 304(SELECT), the other signal in the pair is masked (changes in the other signal prevented from affecting circuits in synchronous circuit 300) till the change in the first signal has propagated through the corresponding synchronizer (360A or 360B). FIG. 5 is a diagram illustrating the details of circuit-enhancements to synchronous circuit 300 of FIG. 3 to achieve such masking, as well for overcoming other undesirable effects as described below. Signals 303(ENABLE) and 304 (SELECT) shown in FIG. 5 correspond respectively to signals 303(ENABLE) and 304 (SELECT) of FIG. 3.

However, signals 303(ENABLE) and 304 (SELECT) shown in FIG. 5 are not received as external inputs (e.g., on paths 132 (SELECT) and 133 (ENABLE) of FIG. 1, when synchronous circuit 300 is implemented in place of synchronous multiplexer and enable circuit 120). Instead, external select and enable inputs (such as 133 (ENABLE) and 132 (SELECT) of FIG. 1) are received on paths 501 and 502 respectively, and processed to generate signals 303(ENABLE) and 304 (SELECT), to avoid glitches and other drawbacks, as described below. Thus, the circuit of FIG. 5 may be viewed as an "enable-and-select signal generation circuit". Signals 501 and 502 are respectively labeled EXT-ENABLE and EXT-SELECT.

The diagram of FIG. 5 is shown containing delay-buffers 590A and 590B, XNOR gates 510A, 520A, 510B and 520B, XOR gates 560A and 560B, two-input AND gates 530 and 540B, OR gate 540A, NOR gate 570, and three-input AND gate 580. Signals 303(ENABLE) and 304 (SELECT) are provided as outputs of respective flip-flops 550A and 550B. XNOR gate 510A compares signal 501 (EXT-ENABLE) and signal 334A to determine if the signals have the same logic value. The output of XNOR gate 510A is a logic 1, if 501 (EXT-ENABLE) has the same logic value as signal 334A, and logic zero otherwise. The output of XNOR gate 510A is provided as one input to AND gate 540B whose output is provided as a clock to flip-flop 550B. For the output of flip-flop 550B to change state to provide the desired value of 304 (SELECT), the output of XNOR gate 510A must be a logic one. Hence, effectively, a change in the logic value of 304 (SELECT) is allowed only if 501 (EXT-ENABLE) and 334A have the same logic values, i.e., only when any change in 501 (EXT-ENABLE) has propagated through synchronizer 360A (FIG. 3) and 'reached' node 334A.

Applying a similar analysis, a change in the logic value of 303 (ENABLE) is allowed only if 502(EXT-SELECT) and 334B have the same logic values, i.e., only when any change in 502(EXT-SELECT) has propagated through synchronizer 360B (FIG. 3) and 'reached' node 334B. As a result, any glitch due to closely-spaced transitions in 303(ENABLE) and 304 (SELECT) is prevented from occurring.

However, changes in 501(EXT-ENABLE) and 502 (EXT-SELECT) that cause a pulse of width less than the delay of XNOR gate 510A (or 510B) may still reach output 351, and cause undesirable glitches. This could occur since XNOR gates 510A and 510B may require a finite interval of time, equal to the corresponding gate delay, to resolve whether the corresponding inputs have the same logic values or not. Buffers 590A and 590B are implemented to prevent the glitches. Buffer 590A delays signal 501 by a duration equal to the delay of XNOR gate 510A. Hence, any change in the input (501) to flip-flop 550A is delayed till XNOR gate 510A resolves whether 501 (EXT-ENABLE) and signal 334A have the same logic value or not. Similarly, buffer 590B delays signal 502 by a duration equal to the delay of XNOR gate 510B, and any change in the input (502) to flip-flop 550B is delayed till XNOR 510B resolves whether 502 (EXT-SELECT) and signal 334B have the same logic value or not. As a result, glitches with pulse widths less than or equal to the delay of XNOR gate 510A or 510B are prevented from occurring.

Another problem that could occur is when outputs of both XNOR gates 510A and 510B are at logic zero, a situation that can happen when the inputs 501 & 502 toggle close to each other. Assuming OR gate 540A and AND gates 540B and 530 were not present, the clocks provided to each of flip-flops 550A and 550B would remain permanently at logic zero, thereby leading to a deadlock condition, with no further changes in values of 303 (ENABLE) and 304 (SELECT) being allowed. To avoid such a deadlock from occurring, one of flip-flops 550A and 550B is given priority and forcibly enabled under such a condition.

In the circuit of FIG. 5, flip-flop 550A is given priority and forcibly enabled. The connections to and from OR gate 540A are provided to forcibly enable flip-flop 550A. Alternatively, if flip-flop 550B is to be given priority, OR gate 540A may be inserted between AND gate 540B and flip-flop 550B, with inputs of OR gate 540A receiving the output of AND gate 540B instead of the output of AND gate 530 (as shown in FIG. 5), the output of OR gate 540A being provided to the clock input of flip-flop 550B instead of to the clock input of flip-flop 550A (as in FIG. 5). Clock input of flip-flop 550A would then be provided by the output of AND gate 530.

A yet another problem that may potentially cause glitches in output 351 is a glitch in signals 501(EXT-ENABLE) or 502 (EXT-SELECT) itself. An example of such a potential scenario is when 501 (EXT-ENABLE) is at logic one, but 502 (EXT-SELECT) switches from logic one to logic zero, and quickly back to logic one again. A potential result of such a pulse on 502 (EXT-ENABLE) is that one of the clocks may be provided at output 351 for the duration of the pulse.

To address such a potential problem (namely, undesirable effects due to glitches/pulses on signals 501(EXT-ENABLE) or 502 (EXT-SELECT) itself), the circuit of FIG. 5 determines if a change in signals 303 (ENABLE) and 304 (SELECT) has propagated through the corresponding synchronizer to the respective outputs 334A and 334B. Only if the change has propagated to the respective output node is a subsequent change in any of input signals 501(EXT-ENABLE) or 502 (EXT-SELECT) allowed to affect (propagate through) the circuit of FIG. 5 (and hence through the circuit of FIG. 3). XNOR gates 520A and 520B are implemented to effect the above operation.

The output of XNOR gate 520A is provided as an input to AND gate 530. Hence AND gate 530 can respond to a change in the output of XNOR gate 510B only if the output of XNOR gate 520A is a logic one, i.e., only if signals 334A and 303 (ENABLE) have the same logic values, thereby indicating that 303(ENABLE) has propagated to node 334A. Similarly, the output of XNOR gate 520B is provided as an input to AND gate 540B. Hence AND gate 540B can respond to a change in the output of XNOR gate 510A only if the output of XNOR gate 520B is a logic one, i.e., only if signals 334B and 304 (SELECT) have the same logic values, thereby indicating that 304(SELECT) has propagated to node 334B. Hence, synchronous circuit 300 in combination with the circuit of FIG. 5 can operate even in the presence of glitches in signals 501 (EXT-ENABLE) and 502 (EXT-SELECT). Synchronous circuit 300 may alternatively be viewed as the combination of the circuits of FIG. 3 and FIG. 5.

It is noted that according to one prior approach, a synchronous multiplexer with synchronous output-enable feature is implemented using two sets of a pair of synchronizers (similar to synchronizers 360A and 360B). One set is used in a circuit portion that implements a multiplexer operation, while the other is implemented in a circuit portion that implements the output-enable operation. In comparison, synchronous circuit 300 uses only one set of synchronizers, and hence can be implemented using a relatively smaller area in integrated circuit form, and consume lesser power as well. Further, synchronous circuit 300 in conjunction with the circuit of FIG. 5 can operate in the presence of glitches in the select and output enable-signals, and is designed to prevent generation of glitches in output 351, and overcome other undesirable effects as described above.

While synchronous circuit 300 and the circuit of FIG. 5 have been described above as receiving clocks as input signals, in general any type of input signal (such as binary data streams) may also be provided as inputs instead. Further, the specific-type of logic gates shown in FIGS. 3 and 5 may be substituted by other logic gates (or logic-gate combinations) that implement the same logic function.

In the illustrations of FIGS. 1, 3, and 5, although terminals/nodes are shown with direct connections to various other terminals, it should be appreciated that additional components (as suited for the specific environment) may also be present in the path, and accordingly the connections may be viewed as being electrically coupled to the same connected terminals. In addition, the circuit topologies of FIGS. 3 and 5 are merely representative. Various modifications, as suited for the specific environment, without departing from the scope and spirit of several aspects of the embodiment(s) described above, will be apparent to one skilled in the relevant arts by reading the disclosure provided herein.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A digital circuit comprising:
   a first logic gate to receive an enable signal and a select signal, and to generate a first logic output, the first logic output being generated as a logical combination of the enable signal and the select signal;
   a second logic gate to receive the enable signal and a logical complement of the select signal, and to generate a second logic output, the second logic output being generated as a logical combination of the enable signal and a logical complement of the select signal; and
   an output block to receive a first input signal, a second input signal, the first logic output and the second logic output, the output block to provide the first input signal as an output if the first logic output is at a first logic level and the second logic output is at a second logic level, the second input signal as the output if the first logic output is at the second logic level and the second logic output is at the first logic level, and to disable provision of either the first input signal or the second input signal as the output if each of the first logic output and the second logic output is at the second logic level,
   wherein the output block, in response to a change in the value of the first logic output from the first logic level to the second logic level at a first time instance, disables the first input signal from being provided as the output at a second time instance synchronous with an active edge of the first input signal, and
   wherein the output block, in response to a change in the value of the second logic output from the second logic level to the first logic level at a third time instance, provides the second input signal as the output at a fourth time instance synchronous with an active edge of the second input signal.

2. The digital circuit of claim 1, wherein the second time instance occurs later than the first time instance, and the fourth time instance occurs later than the third time instance.

3. The digital circuit of claim 1, wherein the first input signal is a first clock and the second input signal is a second clock, wherein the first clock is not the same as the second clock.

4. The digital circuit of claim 3, wherein the output block comprises:
   a first synchronizer clocked by the first clock, the first synchronizer to receive the first logic signal and to generate a first synchronized signal with respect to an active edge of the first clock; and
   a second synchronizer clocked by the second clock, the second synchronizer to receive the second logic signal and to generate a second synchronized signal with respect to an active edge of the second clock, and
   wherein the first synchronized signal is fed back as an input to the second logic gate, and the second synchronized signal is fed back as an input to the first logic gate,
   wherein the first logic output is generated as a logical combination of the enable signal, the select signal as well as the second synchronized signal, and
   wherein the second logic output is generated as a logical combination of the enable signal, the select signal as well as the first synchronized signal.

5. The digital circuit of claim 4, wherein the first synchronizer comprises a first pair of flip-flops clocked by the first clock, flip-flops in the first pair being connected in series, wherein the second synchronizer comprises a second pair of flip-flops clocked by the second clock, flip-flops in the second pair being connected in series, the output block further comprising:
   a third logic gate to receive the first synchronized signal and the first clock as inputs and providing a first output;
   a fourth logic gate to receive the second synchronized signal and the second clock as inputs and providing a second output; and
   a fifth logic gate to receive the first output and the second output and to generate the output.

6. The digital circuit of claim 5, wherein each of the first logic gate, the second logic gate, the third logic gate and the fourth logic gate is an AND gate, and the fifth logic gate is an OR gate.

7. The digital circuit of claim 5, wherein each of the enable signal and the select signal is generated by an enable-and-select signal generation circuit,
   wherein the enable-and-select signal generation circuit is implemented to ensure that, subsequent to a change in value of a first one of the enable signal and the select signal, the other one of the enable signal and the select signal is masked till the change in value of the first one completes propagation through the corresponding synchronizer.

8. The digital circuit of claim 7, wherein the enable-and-select signal generation circuit comprises:
   a sixth AND gate, a seventh AND gate, an eighth three-input AND gate, a first exclusive-OR (XOR) gate, a second XOR gate, a ninth NOR gate and a tenth OR gate;
   a first buffer to receive a first external signal and to provide a delayed first external signal;
   a third flip-flop to receive the delayed first external signal as a data input, and to provide the enable signal as a data output;
   a second buffer to receive a second external signal and to provide a delayed second external signal;
   a fourth flip-flop to receive the delayed second external signal as a data input, and to provide the select signal as a data output;
   a first exclusive-NOR (XNOR) gate to receive the first external signal and the first synchronized signal as inputs, the output of the first XNOR gate being provided as an input to a sixth AND gate;
   a second XNOR gate to receive the second external signal and the second synchronized signal as inputs, the output of the second XNOR gate being provided as an input to a seventh AND gate;
   a third XNOR gate to receive the enable signal and the first synchronized signal as inputs, the output of the third XNOR gate being provided as another input to the seventh AND gate; and
   a fourth XNOR gate to receive the select signal and the second synchronized signal as inputs, the output of the fourth XNOR gate being provided as another input to the sixth AND gate;
   wherein the tenth OR gate receives an output of the eighth three-input AND gate and an output of the seventh AND gate, the output of the tenth OR gate being provided as a clock input to the third flip-flop;
   wherein the output of the sixth AND gate is provided as the clock input of the fourth flip-flop,
   wherein the first XOR gate receives the delayed first external signal and the enable signal, an output of the first XOR gate being provided as the first input to the eighth three-input AND gate,
   wherein the second XOR gate receives the delayed second external signal and the select signal, an output of the second XOR gate being provided as the second input to the eighth three-input AND gate,
   wherein the ninth NOR gate receives the output of the seventh AND gate and the output of the sixth AND gate, an output of the ninth NOR gate being provided as the third input to the eighth three-input AND gate.

9. A device comprising:
a processor; and
a digital circuit to receive a first clock signal, a second clock signal, an external enable signal, and an external select signal, wherein the digital circuit is designed to provide to the processor one of the first clock signal and the second clock signal depending on the logic value of the external select signal, the digital circuit also designed to enable or disable provision to the processor of a selected one of the first clock signal and the second clock signal depending on the logic value of the external enable signal, the digital circuit comprising:
   a first logic gate to receive an enable signal and a select signal, and to generate a first logic output, the first logic output being generated as a logical combination of the enable signal and the select signal, the enable signal and the select signal being derived from the external enable signal and the external select signal respectively;
   a second logic gate to receive the enable signal and a logical complement of the select signal, and to generate a second logic output, the second logic output being generated as a logical combination of the enable signal and the logical complement of the select signal; and
   an output block to receive the first clock signal, the second clock signal, the first logic output and the second logic output,
   the output block to provide the first clock signal as an output if the first logic output is at a first logic level and the second logic output is at a second logic level, the second clock signal as the output if the first logic output is at the second logic level and the second logic output is at the first logic level, and to disable provision of either the first clock signal or the second clock signal as the output if each of the first logic output and the second logic output is at the second logic level, wherein the output block, in response to a change in the value of the first logic output from the first logic level to the second logic level at a first time instance, disables the first clock signal from being provided as the output at a second time instance synchronous with an active edge of the first clock signal, and wherein the output block, in response to a change in the value of the second logic output from the second logic level to the first logic level at a third time instance, provides the second clock signal as the output at a fourth time instance synchronous with an active edge of the second clock signal.

10. The device of claim 9, wherein the second time instance occurs later than the first time instance, and the fourth time instance occurs later than the third time instance.

11. The device of claim 10, wherein the first clock is not the same as the second clock.

12. The device of claim 11, wherein the output block comprises:

a first synchronizer clocked by the first clock, the first synchronizer to receive the first logic signal and to generate a first synchronized signal with respect to an active edge of the first clock; and a second synchronizer clocked by the second clock, the second synchronizer to receive the second logic signal and to generate a second synchronized signal with respect to an active edge of the second clock, and wherein the first synchronized signal is fed back as an input to the second logic gate, and the second synchronized signal is fed back as an input to the first logic gate, wherein the first logic output is generated as a logical combination of the enable signal, the select signal as well as the second synchronized signal, and wherein the second logic output is generated as a logical combination of the enable signal, the select signal as well as the first synchronized signal.

13. The device of claim 12, wherein the first synchronizer comprises a first pair of flip-flops clocked by the first clock, flip-flops in the first pair being connected in series, wherein the second synchronizer comprises a second pair of flip-flops clocked by the second clock, flip-flops in the second pair being connected in series, the output block further comprising:

a third logic gate to receive the first synchronized signal and the first clock as inputs and providing a first output;

a fourth logic gate to receive the second synchronized signal and the second clock as inputs and providing a second output; and a fifth logic gate to receive the first output and the second output and to generate the output.

14. The device of claim 13, wherein each of the first logic gate, the second logic gate, the third logic gate and the fourth logic gate is an AND gate, and the fifth logic gate is an OR gate.

15. The device of claim 13, wherein each of the enable signal and the select signal is generated by an enable-and-select signal generation circuit, wherein the enable-and-select signal generation circuit is implemented to ensure that, subsequent to a change in value of a first one of the enable signal and the select signal, the other one of the enable signal and the select signal is masked till the change in value of the first one completes propagation through the corresponding synchronizer.

16. The device of claim 15, wherein the enable-and-select signal generation circuit comprises:

a sixth AND gate, a seventh AND gate, an eighth three-input AND gate, a first exclusive-OR (XOR) gate, a second XOR gate, a ninth NOR gate and a tenth OR gate;

a first buffer to receive the external enable signal and to provide a delayed first external signal;

a third flip-flop to receive the delayed first external signal as a data input, and to provide the enable signal as a data output;

a second buffer to receive the external select signal and to provide a delayed second external signal;

a fourth flip-flop to receive the delayed second external signal as a data input, and to provide the select signal as a data output;

a first exclusive-NOR (XNOR) gate to receive the first external signal and the first synchronized signal as inputs, the output of the first XNOR gate being provided as an input to a sixth AND gate;

a second XNOR gate to receive the second external signal and the second synchronized signal as inputs, the output of the second XNOR gate being provided as an input to a seventh AND gate;

a third XNOR gate to receive the enable signal and the first synchronized signal as inputs, the output of the third XNOR gate being provided as another input to the seventh AND gate; and a fourth XNOR gate to receive the select signal and the second synchronized signal as inputs, the output of the fourth XNOR gate being provided as another input to the sixth AND gate;

wherein the tenth OR gate receives an output of the eighth three-input AND gate and an output of the seventh AND gate, the output of the tenth OR gate being provided as a clock input to the third flip-flop;

wherein the output of the sixth AND gate is provided as the clock input of the fourth flip-flop, wherein the first XOR gate receives the delayed first external signal and the enable signal, an output of the first XOR gate being provided as the first input to the eighth three-input AND gate, wherein the second XOR gate receives the delayed second external signal and the select signal, an output of the second XOR gate being provided as the second input to the eighth three-input AND gate, wherein the ninth NOR gate receives the output of the seventh AND gate and the output of the sixth AND gate, an output of the ninth NOR gate being provided as the third input to the eighth three-input AND gate.

* * * * *